US010095530B1

(12) United States Patent
Banga et al.

(10) Patent No.: US 10,095,530 B1
(45) Date of Patent: Oct. 9, 2018

(54) TRANSFERRING CONTROL OF POTENTIALLY MALICIOUS BIT SETS TO SECURE MICRO-VIRTUAL MACHINE

(71) Applicant: Bromium, Inc., Cupertino, CA (US)

(72) Inventors: Gaurav Banga, Cupertino, CA (US); Ian Pratt, Cambridge (GB); Rahul Kashyap, Foster City, CA (US)

(73) Assignee: Bromium, Inc., Cupertino, CA (US)

( * ) Notice: Subject to any disclaimer, the term of this patent is extended or adjusted under 35 U.S.C. 154(b) by 474 days.

(21) Appl. No.: 14/798,228

(22) Filed: Jul. 13, 2015

Related U.S. Application Data

(63) Continuation-in-part of application No. 14/610,282, filed on Jan. 30, 2015, now Pat. No. 9,116,733, which is a continuation-in-part of application No. 13/115,354, filed on May 25, 2011, now Pat. No. 8,972,980, application No. 14/798,228, which is a continuation-in-part of application No. 14/170,281, filed on Jan. 31, 2014, now Pat. No. 9,110,701, which is a continuation of application No. 13/223,091, filed on Aug. 31, 2011, now Pat. No. 8,752,047.

(60) Provisional application No. 61/349,717, filed on May 28, 2010.

(51) Int. Cl.
*G06F 9/455* (2018.01)
*H04L 29/06* (2006.01)
*G06F 21/56* (2013.01)
*G06F 9/44* (2018.01)

(52) U.S. Cl.
CPC ........ *G06F 9/45504* (2013.01); *G06F 21/566* (2013.01); *H04L 63/1416* (2013.01); *H04L 63/1441* (2013.01); *G06F 9/44* (2013.01)

(58) Field of Classification Search
CPC ...... G06F 21/566; G06F 9/45504; G06F 9/44; H04L 63/1441; H04L 63/1416
See application file for complete search history.

(56) References Cited

U.S. PATENT DOCUMENTS

| 5,778,173 | A | 7/1998 | Apte |
| 6,018,342 | A | 1/2000 | Bristor |
| 6,108,799 | A | 8/2000 | Boulay et al. |
| 6,122,741 | A | 9/2000 | Patterson et al. |
| 6,789,156 | B1 | 9/2004 | Waldspurger |
| 6,948,044 | B1 | 9/2005 | Chandrasekaran |

(Continued)

FOREIGN PATENT DOCUMENTS

WO 2008073618 A2 6/2008

*Primary Examiner* — Benjamin C Wu
(74) *Attorney, Agent, or Firm* — Brokaw Patent Law PC; Christopher J. Brokaw

(57) ABSTRACT

Approaches for transferring control to a bit set. At a point of ingress, prior to transferring control to the bit set, a determination is made as to whether the bit set is recognized as being included within a set of universally known malicious bit sets. If the bit set is not so recognized, then another determination is made as to whether the bit set is recognized as being included within a set of locally known virtuous bit sets. If the bit set is recognized as being included within a set of locally known virtuous bit sets, then control is not transferred to the bit set. Upon determining that the bit set is not included within the set of locally known virtuous bit sets, then the bit set is copied into a micro-virtual machine and control is transferred to the bit set within the micro-virtual machine.

19 Claims, 3 Drawing Sheets

(56) References Cited

U.S. PATENT DOCUMENTS

| | | |
|---|---|---|
| 6,959,420 B1 | 10/2005 | Mitchell et al. |
| 7,139,799 B2 | 11/2006 | Qian et al. |
| 7,171,523 B2 | 1/2007 | Yamasaki |
| 7,506,265 B1 | 3/2009 | Traut et al. |
| 7,836,303 B2 | 11/2010 | Levy et al. |
| 7,971,047 B1 | 6/2011 | Vlaovic et al. |
| 7,979,807 B2 | 7/2011 | Subramaniam |
| 7,996,834 B2 | 8/2011 | Araujo, Jr. et al. |
| 8,112,748 B2 | 2/2012 | Pomerantz |
| 8,146,084 B1 | 3/2012 | Meketa |
| 8,151,263 B1 | 4/2012 | Venkitachalam et al. |
| 8,171,141 B1 | 5/2012 | Offer et al. |
| 8,219,987 B1 | 7/2012 | Vlaovic et al. |
| 8,346,727 B1 | 1/2013 | Chester et al. |
| 8,347,263 B1 | 1/2013 | Offer |
| 8,391,494 B1 | 3/2013 | Serenyi |
| 8,392,993 B1 | 3/2013 | Oliver |
| 8,407,438 B1 | 3/2013 | Ranade |
| 8,543,641 B2 | 9/2013 | Cherukuri et al. |
| 8,561,208 B2 | 10/2013 | Corbett et al. |
| 8,601,583 B1 | 12/2013 | Chandrasekhar et al. |
| 8,656,386 B1 | 2/2014 | Baimetov et al. |
| 8,752,047 B2 | 6/2014 | Banga et al. |
| 8,763,136 B2 | 6/2014 | Li |
| 8,776,169 B2 | 7/2014 | Rajagopal et al. |
| 8,776,240 B1 | 7/2014 | Wu et al. |
| 2003/0070089 A1 | 4/2003 | Fu et al. |
| 2003/0204569 A1 | 10/2003 | Andrews et al. |
| 2004/0128670 A1 | 7/2004 | Robinson et al. |
| 2005/0021994 A1 | 1/2005 | Barton et al. |
| 2005/0149726 A1* | 7/2005 | Joshi ............ G06F 21/51 713/164 |
| 2005/0188272 A1 | 8/2005 | Bodorin et al. |
| 2005/0273866 A1 | 12/2005 | Brown et al. |
| 2006/0101189 A1 | 5/2006 | Chandrasekaran et al. |
| 2006/0112342 A1 | 5/2006 | Bantz et al. |
| 2006/0136910 A1 | 6/2006 | Brickell et al. |
| 2006/0143617 A1 | 6/2006 | Knauerhase et al. |
| 2006/0184937 A1 | 8/2006 | Abels et al. |
| 2006/0288343 A1 | 12/2006 | Pallister |
| 2007/0089111 A1 | 4/2007 | Robinson et al. |
| 2007/0157307 A1 | 7/2007 | Katoh et al. |
| 2007/0180450 A1 | 8/2007 | Croft et al. |
| 2007/0192329 A1 | 8/2007 | Croft et al. |
| 2007/0198656 A1 | 8/2007 | Mazzaferri et al. |
| 2007/0234337 A1 | 10/2007 | Suzuki et al. |
| 2007/0245334 A1* | 10/2007 | Nieh ............ G06F 9/45533 717/168 |
| 2007/0250833 A1 | 10/2007 | Araujo et al. |
| 2008/0001958 A1 | 1/2008 | Vembu et al. |
| 2008/0059556 A1 | 3/2008 | Greenspan et al. |
| 2008/0072276 A1 | 3/2008 | Pouliot |
| 2008/0086779 A1 | 4/2008 | Blake et al. |
| 2008/0127348 A1 | 5/2008 | Largman et al. |
| 2008/0133722 A1 | 6/2008 | Ramasundaram et al. |
| 2008/0148400 A1 | 6/2008 | Barron et al. |
| 2008/0209138 A1 | 8/2008 | Sheldon et al. |
| 2008/0244028 A1 | 10/2008 | Le et al. |
| 2008/0244579 A1 | 10/2008 | Muller |
| 2008/0271017 A1 | 10/2008 | Herington |
| 2008/0320590 A1 | 12/2008 | Craft et al. |
| 2009/0007242 A1 | 1/2009 | Subramanian et al. |
| 2009/0044024 A1* | 2/2009 | Oberheide ............ G06F 21/562 713/188 |
| 2009/0070869 A1 | 3/2009 | Fan et al. |
| 2009/0119541 A1 | 5/2009 | Inoue et al. |
| 2009/0125902 A1* | 5/2009 | Ghosh ............ G06F 9/45533 718/1 |
| 2009/0158140 A1 | 6/2009 | Bauchot et al. |
| 2009/0165133 A1 | 6/2009 | Hwang et al. |
| 2009/0172660 A1 | 7/2009 | Klotz et al. |
| 2009/0172820 A1 | 7/2009 | Watson |
| 2009/0249472 A1 | 10/2009 | Litvin et al. |
| 2009/0260007 A1 | 10/2009 | Beaty et al. |
| 2009/0276783 A1 | 11/2009 | Johnson et al. |
| 2009/0282483 A1 | 11/2009 | Bennett |
| 2009/0284535 A1 | 11/2009 | Pelton et al. |
| 2009/0300076 A1 | 12/2009 | Friedman et al. |
| 2009/0300599 A1 | 12/2009 | Piotrowski |
| 2009/0300604 A1* | 12/2009 | Barringer ............ G06F 11/3664 717/178 |
| 2009/0300641 A1* | 12/2009 | Friedman ............ G06F 11/3664 718/104 |
| 2009/0313620 A1 | 12/2009 | Sedukhin et al. |
| 2009/0328033 A1 | 12/2009 | Kohavi et al. |
| 2009/0328221 A1 | 12/2009 | Blumfield et al. |
| 2010/0017756 A1 | 1/2010 | Wassom, Jr. et al. |
| 2010/0058042 A1 | 3/2010 | Locker et al. |
| 2010/0115621 A1 | 5/2010 | Staniford et al. |
| 2010/0122343 A1 | 5/2010 | Ghosh et al. |
| 2010/0132038 A1* | 5/2010 | Zaitsev ............ G06F 21/552 726/22 |
| 2010/0192224 A1 | 7/2010 | Ferri et al. |
| 2010/0199199 A1 | 8/2010 | Kumar et al. |
| 2010/0235830 A1* | 9/2010 | Shukla ............ G06F 9/44526 718/1 |
| 2010/0235831 A1 | 9/2010 | Dittmer |
| 2010/0251388 A1 | 9/2010 | Dorfman |
| 2010/0257523 A1 | 10/2010 | Frank |
| 2010/0299667 A1 | 11/2010 | Ahmad et al. |
| 2011/0022694 A1 | 1/2011 | Dalal et al. |
| 2011/0023028 A1 | 1/2011 | Nandagopal et al. |
| 2011/0035494 A1 | 2/2011 | Pandey et al. |
| 2011/0083186 A1* | 4/2011 | Niemela ............ G06F 21/566 726/24 |
| 2011/0093953 A1 | 4/2011 | Kishore et al. |
| 2011/0154431 A1 | 6/2011 | Walsh |
| 2011/0173251 A1 | 7/2011 | Sandhu et al. |
| 2011/0209140 A1 | 8/2011 | Scheidel et al. |
| 2011/0239291 A1 | 9/2011 | Sotka |
| 2011/0258441 A1 | 10/2011 | Ashok et al. |
| 2011/0258621 A1 | 10/2011 | Kern |
| 2011/0296412 A1 | 12/2011 | Banga et al. |
| 2011/0296487 A1 | 12/2011 | Walsh |
| 2011/0302577 A1 | 12/2011 | Reuther et al. |
| 2012/0005672 A1 | 1/2012 | Cervantes et al. |
| 2012/0030750 A1* | 2/2012 | Bhargava ............ H04L 63/02 726/13 |
| 2012/0079596 A1* | 3/2012 | Thomas ............ G06F 21/55 726/24 |
| 2012/0089666 A1 | 4/2012 | Goswami et al. |
| 2012/0089980 A1 | 4/2012 | Sharp et al. |
| 2012/0246598 A1 | 9/2012 | Narayanan |
| 2012/0254860 A1 | 10/2012 | Bozek et al. |
| 2012/0260250 A1 | 10/2012 | Maeda et al. |
| 2012/0288012 A1 | 11/2012 | Staikos et al. |
| 2012/0297383 A1 | 11/2012 | Meisner et al. |
| 2012/0311560 A1 | 12/2012 | Dobrovolskiy et al. |
| 2013/0024644 A1 | 1/2013 | Givargis et al. |
| 2013/0091570 A1 | 4/2013 | McCorkendale et al. |
| 2013/0159987 A1 | 6/2013 | Shi et al. |
| 2013/0191924 A1 | 7/2013 | Tedesco et al. |
| 2013/0246563 A1 | 9/2013 | Cardozo |
| 2013/0254829 A1 | 9/2013 | Jakubowski et al. |
| 2013/0283266 A1 | 10/2013 | Baset et al. |
| 2013/0288647 A1 | 10/2013 | Turgeman |
| 2013/0305244 A1 | 11/2013 | Pohlmann et al. |
| 2014/0068756 A1 | 3/2014 | Dorfman |
| 2014/0123319 A1 | 5/2014 | Porjo et al. |
| 2014/0143825 A1 | 5/2014 | Behrendt et al. |
| 2014/0201525 A1 | 7/2014 | Korthny et al. |
| 2014/0351810 A1 | 11/2014 | Pratt et al. |
| 2015/0089497 A1 | 3/2015 | Borzycki et al. |

\* cited by examiner

TRANSFERRING CONTROL OF POTENTIALLY MALICIOUS BIT SETS TO SECURE MICRO-VIRTUAL MACHINE

CLAIM OF PRIORITY

This application is a continuation-in-part of, and claims priority to, U.S. non-provisional patent application Ser. No. 14/610,282, filed Jan. 30, 2015, which has a priority date of May 28, 2010, invented by Gaurav Banga et al, entitled "Automated Provisioning of Secure Virtual Execution Environment Using Virtual Machine Templates Based on Requested Activity," the contents of which are hereby incorporated by reference for all purposes as if fully set forth herein.

This application is a continuation-in-part of, and claims priority to, U.S. non-provisional patent application Ser. No. 14/170,281, filed Jan. 31, 2014, which has a priority date of Aug. 31, 2011, invented by Gaurav Banga et al, entitled "Automated Identification of Virtual Machines to Process or Receive Untrusted Data Based on Client Policies," the contents of which are hereby incorporated by reference for all purposes as if fully set forth herein.

FIELD OF THE INVENTION

Embodiments of the invention relate to transferring control to a bit set in a secure manner.

BACKGROUND

The protection of the privacy and integrity of the data and resources of a computer is a well-recognized need. However, the best way to protect a computer's data and resources against attacks and intrusion has been the subject of much discussion, debate, and development of the years.

An early approach for securing a computer against the potential dangers of the Internet, which came to prominence in the public eye around 1990, involved the use of a firewall. Early firewalls were software applications which were positioned in the flow of network traffic between a computer and a public network, such as the Internet. The firewall prevented the exchange of certain types of network traffic to any computer behind the firewall. Initially, firewalls were configured to only allow email or SMTP network traffic to be exchanged with devices behind the firewall. Over time, it became desirable for additional types of network traffic to be allowed through the firewall; as such, it became commonplace for firewalls to permit additional types of network traffic (such as FTP and WWW traffic) through the firewall. Firewalls have evolved from consisting of a pure software implementation to being implemented, by certain vendors, as specialized hardware appliances.

As computers became more popular in the home and the workplace, malware began to spread to computers not just through a public network but also through the sharing of portable storage mediums, such as floppy disks. Malware which resides on portable storage mediums could infect a computer not connected to a public network. To combat this new attack vector, antivirus software was developed. Antivirus software is software that analyzes the files of a computer-readable medium to identify any files which have been previously identified as being malicious. Once malicious files have been identified, the antivirus software quarantines and removes the malicious files.

Firewalls and antivirus software currently form the foundation of modern computer security paradigms. Virtually all computer security approaches are enhancements to one or both of the firewall and antivirus software. For example, firewalls have been embellished to look deeper into network traffic to examine the contents of a data packet in determining whether to permit or deny the data packet passage through the firewall. The firewall may be configured to allow certain types of network traffic deemed permissible by a policy (such as work-related HTTP network traffic) but prevent other types of network traffic deemed impermissible by a policy (such as non-work related HTTP network traffic). Other firewalls may allow certain network traffic to pass through the firewall, but will subsequently check each network communication for malware; upon detecting that a network communication (such as an email) which has already past the firewall did contain malware, the firewall alerts the destination of that network communication that it may already have been compromised.

Antivirus software has also been embellished to rely more on the behavior of an executable file rather than considering the file's signature in determining whether the file is malicious. Unfortunately, the current paradigm for protecting the data and resources of a computer using combinations of firewalls and antivirus software has been demonstrated to be ineffectual.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
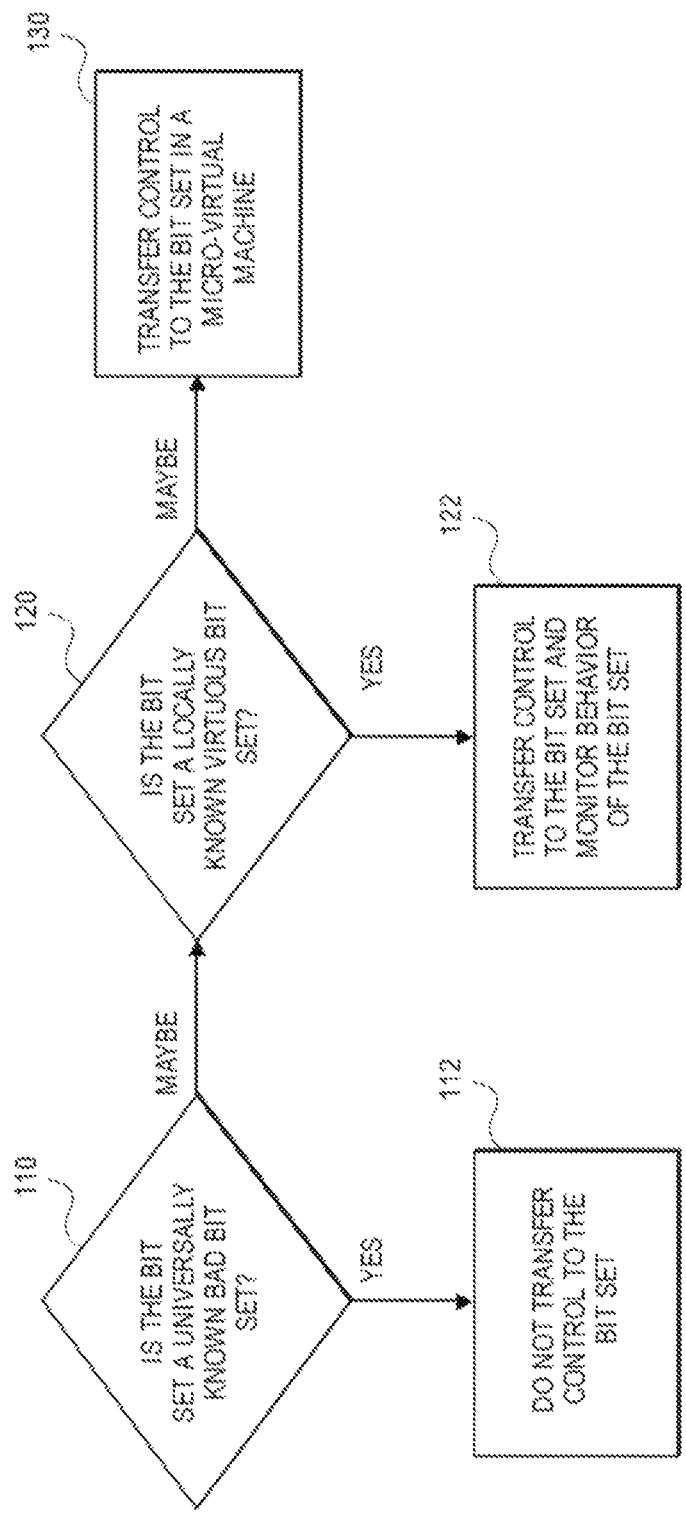
FIG. 1 is a flowchart of the steps for transferring control to a bit set in a secure manner according to one embodiment of the invention.

Approaches for securely transferring control to a bit set are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Shortcomings of Prior Approaches

The current paradigm for protecting the data and resources of a computer, which relies upon firewalls and antivirus software, has been demonstrated to be ineffectual. Applicant submits that the current paradigm is ill-equipped to address many real-world issues, such as mobility, the proliferation of dynamic Internet content, and consumerization, as explained below.

Mobility refers to the recognition that, in the modern world, computers are designed to be mobile and used in a variety of different locations. For example, a user may use their laptop at home, in a coffee shop, at work, or virtual anywhere. Most computers these days are designed to access a wireless network. This is especially true for handheld and mobile devices. However, the particular wireless network used to access the Internet will change as the computer moves to a different wireless access point. As a consequence, the presence and the effectiveness of a firewall at each wireless access point cannot be guaranteed. To illustrate, while you may use a laptop computer at work behind a corporate firewall, if you use your laptop later at a coffee shop, you won't have the benefit of your corporate firewall as you access the Internet using the coffee shop's wireless network. While moving from wireless access point to wireless access point, any firewall that is available is certainly not designed or configured with each individual user's needs and concern in mind. Thus, firewalls provide an unreliable defense against computer security exploits.

Many people use their computers to access the Internet, and in particular, the World Wide Web (WWW). While originally web pages were mainly static in nature, now most web pages contain dynamic content and programs, such as Shockwave Flash. Such dynamic content and programs can execute instructions which cause a machine to become infected with malicious code. Even dynamic content which appears harmless, such as an advertisement displayed on as web site, may be used to insert malicious code onto a computer. Thus, each web site is, in effect, an application which could be used to spread malicious code. As another example, a Microsoft Excel spreadsheet sent via email may contain malicious code which infects a computer which opens and reads the spreadsheet. Firewalls and antivirus software were never designed to combat malicious content, but instead were designed to identify malicious executable files. While executable files do not change frequency, Internet content is ubiquitous and is constantly being created and changed. It is very difficult to identify malware residing in content with an ever changing and evolving nature. At the same time, people have a great need and desire to access Internet content and so it is not practicable to broadly deny access to such content.

Another reason why the current paradigm is ill-equipped is the advent of consumerization, which refers to the increasingly common practice of having the end user, rather than an IT professional, choose the hardware and software of the user's computer. The end user can decide what device he or she wishes to buy and may install a wide variety of different types of programs. As a result, the complexity and variety of hardware and software resources on a computer is often difficult to predict, which in effect, renders planning for all possible computing environments at best impractical and at worst impossible.

These and other issues prevent the current computer security paradigm from being effective in today's environment.

Securely Transferring Control to a Bit Set

Embodiments of the invention advance a new computer security paradigm by securely transferring control to a bit set at a point of ingress. The underpinnings of this security paradigm is the realization that a stored bit set (even a bit set that is in fact malicious) poses no threat until control is transferred to the bit set. As used herein, transferring control to a bit set refers to either executing the bit set or interpreting the bit set. For example, executing an executable file, a dynamic-link library (DLL) file, or a plug-in, is an example of executing a bit set. Parsing, interpreting, and rendering a web page, a document file, a spreadsheet file, an Adobe® flash file, or an image file are examples of interpreting a bit set. Embodiments of the invention ensure that control is transferring to each bit set in a manner commensurate with the risk posed by that bit set.

FIG. 1 is a flowchart of the steps for transferring control to a bit set in a secure manner according to one embodiment of the invention. The steps of FIG. 1 shall be explained below with reference to FIG. 2, which is a block diagram of a point of ingress (POI) 200 according to one embodiment of the invention. Before explaining the operation of the flowchart of FIG. 1, it will be helpful to discuss certain components depicted in FIG. 2.

Figure 2:
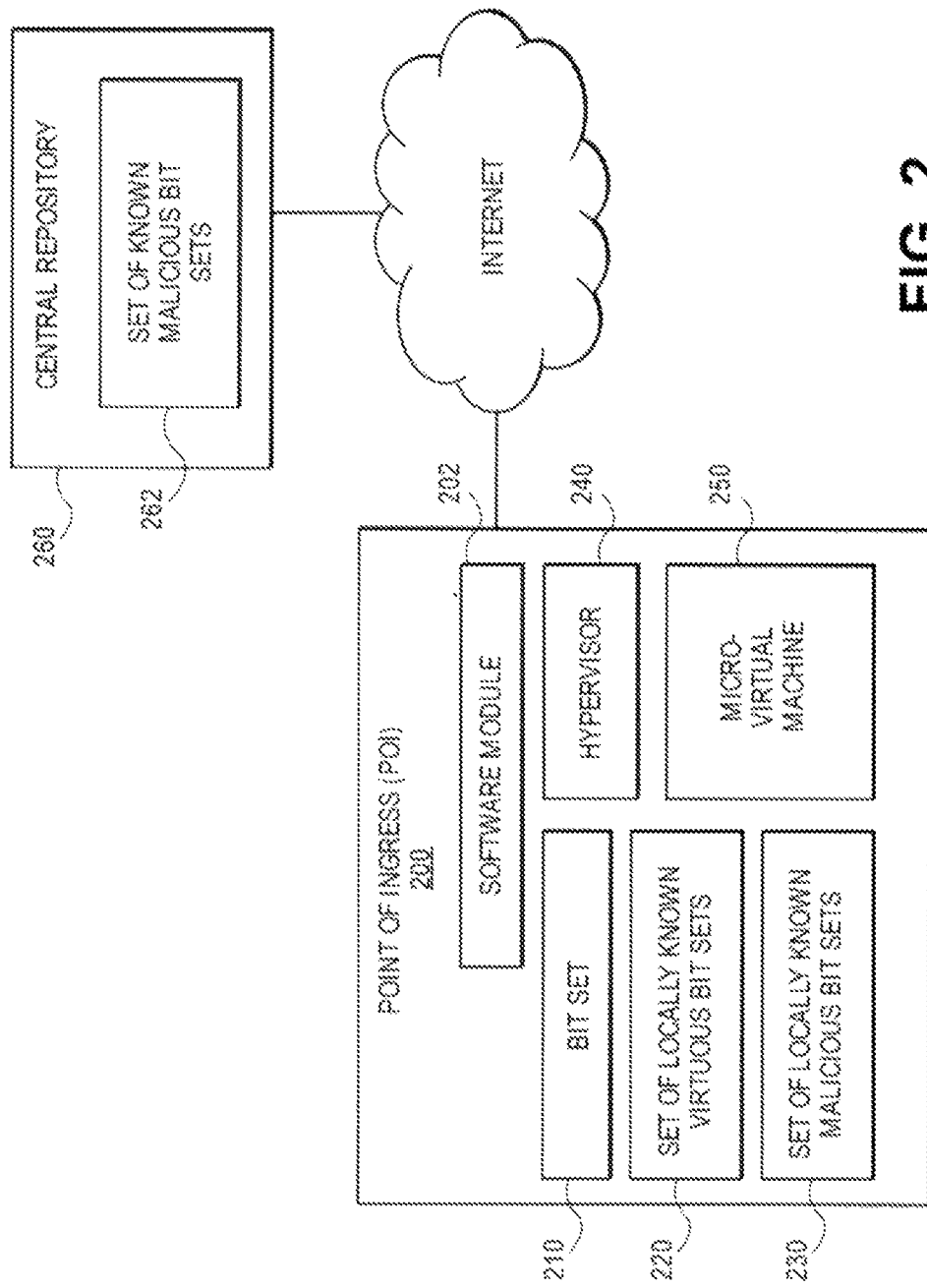
FIG. 2 is a block diagram of a point of ingress according to one embodiment of the invention.

POI 200 shown in FIG. 2 refers to any type of machine that (a) has a non-transitory storage medium that stores one or more bit sets and (b) is connected to a public network, such as the Internet. For example, POI 200 may correspond to a client, a personal computer, a managed (or company owned) computer, an unmanaged (or employee owned) computer, a server (either behind a firewall or a cloud-based server), a cell phone, and the like.

In an embodiment, the steps of FIG. 1 may be performed by software. For example, software module 202 executing in a host operating system (not depicted in FIG. 2) on POI 200 may perform the steps of FIG. 1. In other embodiments, the steps of FIG. 1 may be performed by other software entities (such as hypervisor 240) or may be performed by a combination of two or more software entities.

In the exemplary POI 200 shown in FIG. 2, in addition to software module 202, POI 200 comprises bit set 210, a set of locally known virtuous bit sets 220, a set of locally known malicious bit sets 230, a hypervisor 240, and one or more micro-virtual machines 250.

Bit set 210 refers to a discrete data set. Non-limiting, illustrative examples of bit set 210 include a data file, a data stream, structured data, and unstructured data. Bit set 210 may correspond to an executable file or an interpreted file (such as an image file, a document file, a web page, or a spreadsheet file, for example).

Set of locally known virtuous bit sets 220 is a data set that identifies one or more bit sets which have been deemed to be virtuous. A virtuous bit set is a bit set which is unlikely to contain malicious code. Accordingly, control may be transferred to a virtuous bit set using a lessor standard of safeguards than would otherwise be used since they is a degree of assurance that the bit set has not been altered since being deemed safe. For example, software in a pristine format unaltered since purchase from the vendor would qualify for inclusion in the set of locally known virtuous bit sets 220. As another example, any work product (such as a document or image) produced by an application whose executable file is in the set of locally known virtuous bit sets 220 would also qualify for inclusion in the set of locally known virtuous bit sets 220. Thus, applications have a transitive nature with respect to the bit sets created thereby regarding inclusion within the set of locally known virtuous bit sets 220. As such, the set of locally known virtuous bit sets 220 will tend to grow to include new members over time as applications deemed virtuous create new bit sets (which themselves would be deemed virtuous and thus would be included within set of locally known virtuous bit sets 220). The use of set of locally known virtuous bit sets 220 is explained in further detail below.

Set of locally known malicious bit sets 230 is a data set that identifies one or more bit sets which have been deemed to be malicious. Control cannot be transferred to a bit set which has been deemed malicious according to an embodiment of the invention. The set of locally known malicious bit sets 230 may also grow over time as additional malicious bit sets are identified. In an embodiment explained in further detail below, a malicious bit set may be identified after transferring control to that bit set in micro-virtual machine 250 and observing the bit set performing in a malicious manner; once identified, the set of locally known malicious bit sets 230 may be updated to identify a bit set deemed malicious so that the bit set cannot in the future be transferred control. The use of set of locally known malicious bit sets 230 is explained in further detail below.

Note that while set of locally known virtuous bit sets 220 and set of locally known malicious bit sets 230 are depicted in FIG. 2 as residing on a single machine, in certain embodiments a group of POIs (such as those belonging to an organization, a company, or a local network) may share data in sets 220 and 230 or may access a common, centrally managed and maintained set of locally known virtuous bit sets 220 and set of locally known malicious bit sets 230.

Hypervisor 240 broadly refers to any mechanism for managing and overseeing the instantiation and executing of one or more micro-virtual machines 250. Hypervisor 240 may be a type 1 hypervisor, a type 2 hypervisor, or a hypervisor as discussed within U.S. patent application Ser. No. 13/526,755, entitled "Ensuring the Privacy and Integrity of a Hypervisor, invented by Ian Pratt, the contents of which are hereby incorporated by reference for all purposes as if fully set forth herein.

One or more micro-virtual machines 250 refers to any virtual machine instantiated to have characteristics suitable for transferring control to bit set 210 therein. In an embodiment, one or more micro-virtual machines 250 may correspond to a UCVM as discussed in U.S. patent application Ser. No. 13/115,354, entitled "Automated Provisioning of Secure Virtual Execution Environment Using Virtual Machine Templates Based on Requested Activity," invented by Gaurav Banga et al.

Having discussed the components of POI 200, attention is returned to the flowchart of FIG. 1. The process depicted in FIG. 1 is performed every time a bit set loaded into the memory of POI 200 and control is to be transferred to that bit set in memory. In an embodiment, software module 202 may intercept any request to transfer control to a bit set loaded into memory or otherwise be positioned in the execution path prior to transferring control to that bit set. After intercepting an attempt to transfer control to a bit set loaded into memory, and before control is transferred to that bit set, software module 202 will perform the steps of FIG. 1.

For the sake of providing a concrete example, in the explanation of FIG. 1 below, software module 202 intercepts a request to transfer control to bit set 210 loaded into the memory of POI 200.

In step 110, a determination is made by software module 202 as to whether bit set 210 is in set of universally known bad bit sets. This determination is made to ascertain whether bit set 210 is known to be malicious by anyone party, regardless of whether the party is local or remote to POI 200.

In an embodiment, step 110 may be performed by first determining if bit set 210 is known to be malicious by a local party, and if bit set 210 is not known to be malicious by a local party, then a further determination is made as to whether bit set 210 is known to be malicious by parties remote to POI 200. Such a two-step approach is advantageous as it saves the time and effort as ascertaining if bit set 210 is known to be malicious by others in the world if local parties have already ascertained bit set 210 is malicious.

In an embodiment, to determine if bit set 210 is known to be malicious by a local party, a cryptographic profile that identifies bit set 210 in a unique fashion may be generated or otherwise obtained. Thereafter, the set of locally known malicious bit sets 230 may be consulted to see if the cryptographic profile for bit set 210 is identified by or contained therein. If so, then this indicates that bit set 210 is known to be malicious by a local party, and thus, bit set 210 would be in a set of universally known bad bit sets.

If the cryptographic profile for bit set 210 is identified by or contained within the set of locally known malicious bit sets 230, then a further determination is made as to whether bit set 210 is known to be malicious by parties which are remote to POI 200. In an embodiment, this may be performed by consulting a set of known malicious bit sets 262 maintained by central repository 260.

Central repository 260, as broadly used herein, represents one or more publically accessible repositories or cloud-based services that may be used to identify whether bit set 210 is malicious. For example, central repository 260 may correspond to one or more of Google® Safe Browsing (which is a service that enables applications to check URLs against Google's constantly updated lists of suspected phishing and malware pages), Google® VirusTotal (which is a service that analyzes files and URLs enabling the identification of viruses, worms, Trojans, and other kinds of malicious content detected by antivirus engines and web site scanners), and Microsoft® Azure Trust Center. As depicted in FIG. 2, POI 200 may communicate with central repository 260 over a network, such as the Internet.

If the cryptographic profile for bit set 210 is identified by or contained within the set of malicious bit sets 262 maintained by central repository 260, then this indicates that bit set 210 is in a set of universally known bad bit sets.

In an embodiment, if central repository 260 is not reachable by POI 200 for any reason, then software module 202 will treat bit set 210 as not being in a universally known bad bit set. The theory behind such a decision is to act upon the known information or evidence that is available, rather than assuming the worst-case scenario. Thus, the determination of step 210 is not intended to be a perfect assessment of whether bit set 210 will ultimately be malicious, but instead, is a decision that attempts to make a judgment call on the best available evidence at that time.

If software module 202 determines that bit set 210 is within set of universally known bad bit sets, then, as depicted in FIG. 1, POI 200 does not transfer control to bit set 210 (step 112). In this case, the user may receive an alert or message that bit set 210 is malicious content and that it will not be executed, opened, viewed, interpreted, or otherwise have control transferred to it. Additionally, software module 202 may alert or notify an IT administrator or professional that bit set 210 on POI 200 is malicious. Embodiments may perform other security actions in response to the determination that bit set 210 is malicious.

On the other hand, if in step 110, software module 202 determines that bit set 210 is not within set of universally known bad bit sets, then embodiments do not treat bit set 210 as conclusively being free of malicious code. Instead, as depicted in FIG. 1, bit set 210 is considered as only potentially being free of malicious code as processing proceeds to step 120.

In step 220, software module 202 determines whether bit set 210 is in set of locally known virtuous bit sets 220. In an embodiment, the set of locally known virtuous bit sets 220 may be updated based on the providence of bit sets within the enterprise or local computing environment of POI 200.

As context, embodiments may deem it reasonable to assume that installations of software from manufacture provided or controlled sources (such as installed Microsoft® Office from an official Microsoft® source) are virtuous, i.e., free of malicious code or content). Any content created by a virtuous source is itself deemed virtuous until such content is merged with unknown or malicious content or acted upon by a software process of unknown or malicious providence. The set of locally known virtuous bit sets 220 may be updated as content is created within the enterprise or local computing environment of POI 200.

In an embodiment, a cryptographic profile may be calculated to uniquely identify bit sets in the enterprise or computing environment in which POI 200 operates. An enterprise may implement the set of locally known virtuous bit sets 220 by maintain a table, a data structure, or other such data store that lists cryptographic profiles along with the providence assigned to the bit set associated with each cryptographic profile. Other approaches for maintaining information that describes providence of bit sets in an enterprise which may be used to implemented the set of locally known virtuous bit sets 220 are described in U.S. patent application Ser. No. 14/333,278, entitled "Application Wide Providence," invented by Vikram Kapoor, Ian Pratt, and Gaurav Banga, filed Jul. 16, 2014, the contents of which are hereby incorporated by reference for all purposes as if fully set forth herein.

Content may be modified and created very quickly. Providence information may be carried forward automatically by embodiments as content is created or modified by applications or processes by updating the set of locally known virtuous bit sets 220.

If software module 202 determines that bit set 210 is in set of locally known virtuous bit sets 220, then in step 122, control is transferred to bit set 210. After transferring control to bit set 210, the behavior of bit set 210 is monitored. This is advantageous because even though the bit set 210 is assumed to be virtuous and free of malicious code or content, bit set 210 could have an implementation or design flaw that has negative consequences for POI 200. By monitoring the operation of bit set 210 after control is transferred to bit set 210, if malicious activity is detected, then the malicious activity may be halted and the set of locally known malicious bit sets 230 may be updated to include bit set 210 to prevent further malicious activity.

On the other hand, if software module 202 determines that bit set 210 is not in set of locally known virtuous bit sets 220, then bit set 210 is considered to potentially safe enough to execute, but not without taking additional safeguards. Thus, if bit set 210 is not in set of locally known virtuous bit sets 220, in step 130, control is transferred to bit set 210 in micro-virtual machine 250 that is specifically tailored to have characteristics designed to eliminate any risk posed by bit set 210 and to possess access to only those resources of POI 200 which are deemed necessary in the execution or interpretation of bit set 210. Techniques for transferring control to bit set 210 in a micro-virtual machine 250 are discussed in U.S. non-provisional patent application Ser. No. 13/115,354 and U.S. non-provisional patent application Ser. No. 14/170,281.

As shall be appreciated, embodiments can protect the data and resources of a computer using the best information available about whether a bit set comprises malicious code or content, even if such information is less than complete or entirely accurate. With the evolving nature of today's digital landscape, the security paradigm described herein overcomes the obstacles and limitations experienced by prior art and affords significant security to data and resources of a computer against a plethora of potential security exploits.

Hardware Mechanisms

Figure 3:
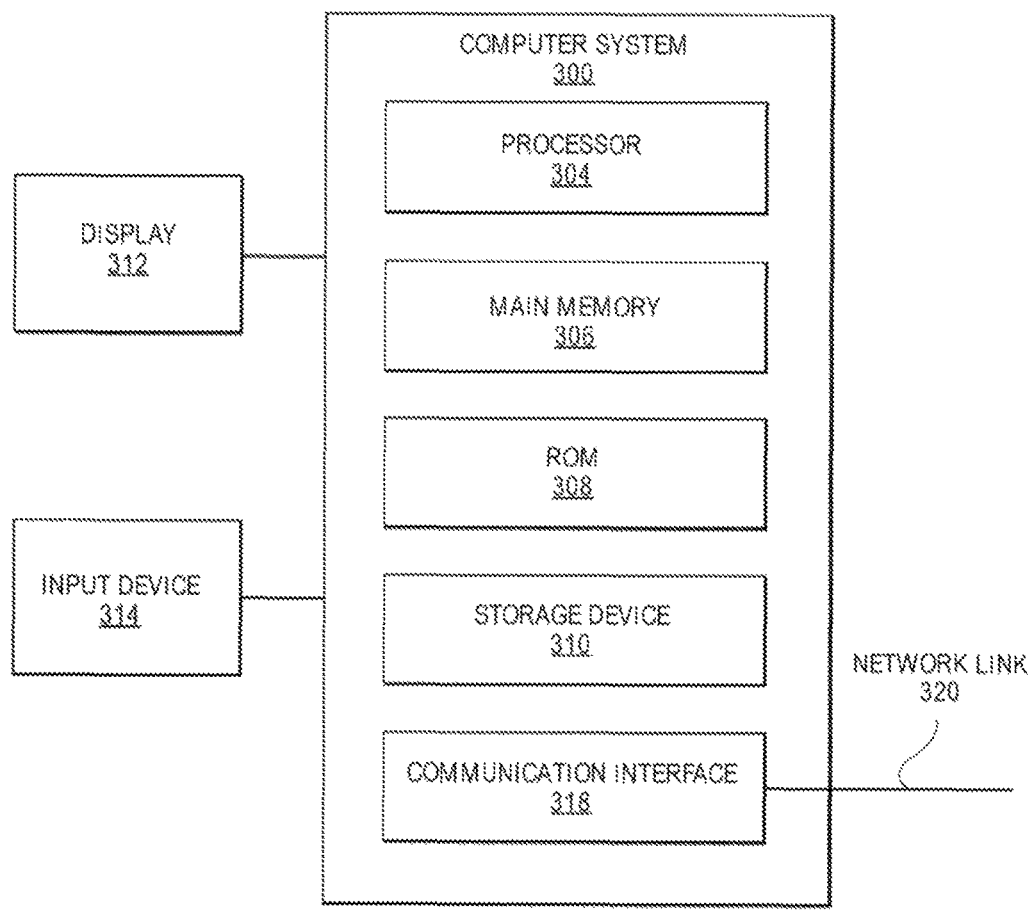
FIG. 3 is a block diagram that illustrates the hardware components of a computer system upon which an embodiment of the invention may be implemented.

In an embodiment, POI 200 and central repository 260 may each correspond to, be implemented on, or include a computer system. FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage mediums storing one or more sequences of instructions for transferring control to a bit set, which when executed by one or more processors, causes:
    associating a signed cryptographic hash digest to the bit set to identify a locally determined provenance of the bit set,
    wherein the locally determined provenance of the bit set is based, at least in part, upon the locally determined provenance of the software entity creating the bit set and the manner in which the bit set was created; and
    at a point of ingress, transferring control to the bit set by performing:
        prior to transferring control to the bit set, determining if the bit set is in a set of universally known malicious bit sets;
        upon determining that the bit set is not in the set of universally known malicious bit sets, determining whether the bit set is in a set of locally known virtuous bit sets based, at least in part, upon said signed cryptographic hash digest; and
        upon determining that the bit set is not in the set of locally known virtuous bit sets, then copying the bit set into a micro-virtual machine and transferring control to the bit set within the micro-virtual machine.

2. The one or more non-transitory machine-readable storage mediums of claim 1, wherein determining if the bit set is in the set of universally known malicious bit sets further includes:
    consulting a set of locally known malicious bit sets to determine if the bit set is included therein.

3. The one or more non-transitory machine-readable storage mediums of claim 2, wherein membership in the set of locally known malicious bit sets is updated, at least in part, based on observed behavior of a particular bit set in one of a plurality of micro-virtual machines executing within the same local network as the point of ingress.

4. The one or more non-transitory machine-readable storage mediums of claim 1, wherein determining if the bit set is recognized as being included within the set of universally known malicious bit sets further includes:
    after determining that the bit set is not in a set of locally known malicious bit sets, contacting a central repository over a network to determine if the bit set is in the set of known malicious bit sets maintained at the central repository.

5. The one or more non-transitory machine-readable storage mediums of claim 1, further comprising:
    updating the membership of the set of locally known virtuous bit sets based on a locally determined provenance of one or more bit sets.

6. The one or more non-transitory machine-readable storage mediums of claim 1, further comprising:
    upon determining that the bit set is a member of the set of locally known virtuous bit sets, transferring control to the bit set; and
    monitoring the behavior of the bit set during execution or interpretation of the bit set to identify any malicious behavior performed by the bit set.

7. The one or more non-transitory machine-readable storage mediums of claim 1, wherein the bit set corresponds to a data file or a data stream.

8. The one or more non-transitory machine-readable storage mediums of claim 1, wherein transferring control to the bit set within the micro-virtual machine corresponds to either executing or interpreting the bit set within the micro-virtual machine.

9. The one or more non-transitory machine-readable storage mediums of claim 1, wherein copying the bit set into the micro-virtual machine and transferring control to the bit set within the micro-virtual machine further comprises:
    in response to determining that the bit set is not included within the set of locally known virtuous bit sets, (a) selecting a template virtual machine having characteristics specifically tailored to eliminate risk posed by said bit set and (b) using the selected template virtual machine to instantiate said micro-virtual machine, wherein said micro-virtual machine only possess access to resources of said point of ingress deemed necessary in the execution or interpretation of said bit set.

10. An apparatus for transferring control to a bit set, comprising:
one or more processors; and
one or more non-transitory computer-readable storage mediums storing one or more sequences of instructions, which when executed, cause:
associating a signed cryptographic hash digest to the bit set to identify a locally determined provenance of the bit set,
wherein the locally determined provenance of the bit set is based, at least in part, upon the locally determined provenance of the software entity creating the bit set and the manner in which the bit set was created; and
at a point of ingress, transferring control to the bit set by performing:
prior to transferring control to the bit set, determining if the bit set is in a set of universally known malicious bit sets;
upon determining that the bit set is not in the set of universally known malicious bit sets, determining whether the bit set is in a set of locally known virtuous bit sets based, at least in part, upon said signed cryptographic hash digest; and
upon determining that the bit set is not in the set of locally known virtuous bit sets, then copying the bit set into a micro-virtual machine and transferring control to the bit set within the micro-virtual machine.

11. The apparatus of claim 10, wherein determining if the bit set is in the set of universally known malicious bit sets further includes:
consulting a set of locally known malicious bit sets to determine if the bit set is included therein.

12. The apparatus of claim 11, wherein membership in the set of locally known malicious bit sets is updated, at least in part, based on observed behavior of a particular bit set in one of a plurality of micro-virtual machines executing within the same local network as the point of ingress.

13. The apparatus of claim 10, wherein determining if the bit set is recognized as being included within the set of universally known malicious bit sets further includes:
after determining that the bit set is not in a set of locally known malicious bit sets, contacting a central repository over a network to determine if the bit set is in the set of known malicious bit sets maintained at the central repository.

14. The apparatus of claim 10, wherein execution of the one or more sequences of instructions further cause:
updating the membership of the set of locally known virtuous bit sets based on a locally determined provenance of one or more bit sets.

15. The apparatus of claim 10, wherein execution of the one or more sequences of instructions further cause:
upon determining that the bit set is a member of the set of locally known virtuous bit sets, transferring control to the bit set; and
monitoring the behavior of the bit set during execution or interpretation of the bit set to identify any malicious behavior performed by the bit set.

16. The apparatus of claim 10, wherein the bit set corresponds to a data file or a data stream.

17. The apparatus of claim 10, wherein transferring control to the bit set within the micro-virtual machine corresponds to either executing or interpreting the bit set within the micro-virtual machine.

18. The apparatus of claim 10, wherein copying the bit set into the micro-virtual machine and transferring control to the bit set within the micro-virtual machine further comprises:
in response to determining that the bit set is not included within the set of locally known virtuous bit sets, (a) selecting a template virtual machine having characteristics specifically tailored to eliminate risk posed by said bit set and (b) using the selected template virtual machine to instantiate said micro-virtual machine, wherein said micro-virtual machine only possess access to resources of said point of ingress deemed necessary in the execution or interpretation of said bit set.

19. A method for transferring control to a bit set, comprising:
associating a signed cryptographic hash digest to the bit set to identify a locally determined provenance of the bit set,
wherein the locally determined provenance of the bit set is based, at least in part, upon the locally determined provenance of the software entity creating the bit set and the manner in which the bit set was created; and
at a point of ingress, transferring control to the bit set by performing:
prior to transferring control to the bit set, determining if the bit set is in a set of universally known malicious bit sets;
upon determining that the bit set is not in the set of universally known malicious bit sets, determining whether the bit set is in a set of locally known virtuous bit sets based, at least in part, upon said signed cryptographic hash digest; and
upon determining that the bit set is not in the set of locally known virtuous bit sets, then copying the bit set into a micro-virtual machine and transferring control to the bit set within the micro-virtual machine.

* * * * *